United States Patent
Grobis et al.

(10) Patent No.: US 9,190,093 B2
(45) Date of Patent: Nov. 17, 2015

(54) REDUCED ADJACENT TRACK ERRORS IN BIT-PATTERNED MEDIA

(71) Applicant: HGST Netherlands B.V., Amsterdam (NL)

(72) Inventors: Michael Grobis, San Jose, CA (US);
Dan S. Kercher, Santa Cruz, CA (US);
Kurt A. Rubin, San Jose, CA (US)

(73) Assignee: HGST NETHERLANDS, B.V., Amsterdam (NL)

( * ) Notice: Subject to any disclaimer, the term of this patent is extended or adjusted under 35 U.S.C. 154(b) by 0 days.

(21) Appl. No.: 13/760,886

(22) Filed: Feb. 6, 2013

(65) Prior Publication Data

US 2014/0218824 A1    Aug. 7, 2014

(51) Int. Cl.
*G11B 5/74*    (2006.01)
*G11B 5/855*   (2006.01)

(52) U.S. Cl.
CPC .............. *G11B 5/746* (2013.01); *G11B 5/855* (2013.01)

(58) Field of Classification Search
CPC ........... C23C 14/48; G11B 5/82; G11B 5/743
USPC ........................................... 427/526
See application file for complete search history.

(56) References Cited

U.S. PATENT DOCUMENTS

| | | | |
|---|---|---|---|
| 3,792,452 A * | 2/1974 | Dixon et al. | 427/526 |
| 6,383,597 B1 * | 5/2002 | Fullerton et al. | 428/836.1 |
| 6,495,240 B1 | 12/2002 | Wada et al. | |
| 6,906,879 B1 * | 6/2005 | Albrecht et al. | 360/55 |
| 7,241,516 B1 | 7/2007 | Acharya et al. | |
| 7,867,406 B2 | 1/2011 | Albrecht et al. | |
| 7,876,529 B1 | 1/2011 | Benakli et al. | |
| 8,021,769 B2 * | 9/2011 | Berger et al. | 428/827 |
| 8,147,995 B2 | 4/2012 | Xi et al. | |
| 8,163,405 B2 | 4/2012 | Hauet et al. | |
| 9,053,720 B1 * | 6/2015 | Chye et al. | 1/1 |
| 2003/0197988 A1 * | 10/2003 | Hasegawa et al. | 360/324.12 |
| 2009/0135527 A1 * | 5/2009 | Lee et al. | 360/314 |
| 2009/0166184 A1 * | 7/2009 | Zhou et al. | 204/192.11 |
| 2010/0033872 A1 * | 2/2010 | Xi et al. | 360/135 |
| 2010/0096256 A1 * | 4/2010 | Nalamasu et al. | 204/192.34 |
| 2010/0227202 A1 * | 9/2010 | Gao et al. | 428/848.2 |
| 2012/0075747 A1 | 3/2012 | Dobisz et al. | |

OTHER PUBLICATIONS

Chulmin Choi et al., Diameter-Reduced Islands for Nonfabrication Toward Bit Pattered Magnetic Media, Magnetics, IEEE Transactions, vol. 47, Issue 10, Oct. 2011.

* cited by examiner

*Primary Examiner* — Dah-Wei D Yuan
*Assistant Examiner* — Kristen A Dagenais
(74) *Attorney, Agent, or Firm* — Kunzler Law Group, PC (57) ABSTRACT

The present disclosure relates to a magnetic medium that includes a substrate and a bit patterned magnetic layer applied to the substrate. The bit-patterned magnetic layer includes islands and each island includes a first magnetic material having a first magnetic anisotropy and that has a top surface, a bottom surface, and a peripheral surface. Each island also includes a second magnetic material covering the peripheral surface of the first magnetic material and having a second magnetic anisotropy that is higher than the first magnetic anisotropy. In one embodiment, the first magnetic material may comprise a nucleation domain in a centrally located surface portion of the magnetic islands and/or the second magnetic material may comprise an outer shell on the peripheral surface of the islands.

7 Claims, 8 Drawing Sheets

REDUCED ADJACENT TRACK ERRORS IN BIT-PATTERNED MEDIA

FIELD

The subject matter of the present disclosure relates to magnetic media, and more particularly relates to reducing magnetic storage errors in bit-patterned magnetic recording media.

BACKGROUND

For many years conventional magnetic storage devices have been used to store data and information. Magnetic storage devices generally include units of magnetic material that can be polarized to distinct magnetic states, where the direction of the magnetization points in different directions and those different directions can be referred to as a positive state and a negative state. In this application we will refer to those different directions of magnetization as corresponding to different polarities. Each bit can store information (generally binary information in the form of either a 1 or a 0) according to the magnetic polarization state of the bit. Accordingly, magnetic storage devices generally include a "read" element that passes over the magnetic material and perceives the magnetic polarization state of each bit and a "write" element that passes over the magnetic material and changes the magnetic polarization state of each bit, thereby recording individual units of information. Therefore, the amount of information that can be stored on a magnetic storage device is directly proportional to the number of magnetic bits on the magnetic storage device.

There are various types of magnetic storage devices and each type involves different fabrication techniques. For example, conventional granular magnetic recording devices are disks that have multiple grains in each magnetic bit. In granular magnetic devices, all of the domains are co-planar and the surface of the disk is relatively smooth and continuous. In order to increase the amount of information that can be stored on a granular magnetic disk, the number of grains per magnetic bit can be decreased while keeping the grain size approximately the same. However, with fewer grains in each bit, there is decreased signal to noise ratio (less signal, more noise). In order to maintain a better signal to noise ratio, methods have been developed that decrease both the size of the magnetic bit and the size of the individual grains making up each magnetic bit, thus keeping the same number of grains in each magnetic bit. However, when the grains become too small, thermal fluctuations can cause the grains to spontaneously reverse polarity, thus resulting in unstable storage and a loss of information.

Bit-patterned media (BPM) is another example of magnetic storage media. In bit-patterned media, each bit is a single domain magnetic island or region, rather than a collection of contiguous magnetic grains. The BPM bits can be topographically patterned using lithographic and etching techniques to form magnetically isolated bit islands surrounded by trenches. In some instances, the trenches are formed by etching away a magnetic material and in other instances the physical patterns are etched into a non-magnetic substrate followed by a deposition of magnetic material over the patterned substrate. Because of the physical separation between the elevated bit islands and the trenches, the width of each distinct bit island can be decreased in order to increase the areal bit density of the device while still maintaining a high signal to noise ratio and high thermal stability.

However, etching bit-patterned media with bit densities exceeding one trillion bits per square inch (Tbit/in$^2$) pushes the resolution of conventional etching techniques to their limits. Such etching techniques generally include covering a portion of the material to be etched with a mask or a protective material that shields portions of the underlying material from the etching process—i.e. the mask protects the islands while leaving exposed the portions of the material that will be etched to form the trenches. Such etching processes degrade the peripheral walls of the islands. This damage to the walls of the islands may decrease the magnetic anisotropy of the magnetic material at the islands' periphery, thus increasing the likelihood of spontaneous magnetic switching initiated at the peripheral edges of the islands.

Thus, conventional bit-patterned media is susceptible to spontaneous magnetic reversal caused by adjacent track exposure. In other words, as the read/write head passes over a particular track of nano-sized islands on a bit-patterned medium, occasionally the magnetic field from the read/write head will interact with the peripheral edges of magnetic islands in adjacent tracks. This inadvertent interaction with adjacent tracks may initiate magnetic switching in adjacent islands and may therefore cause a loss or corruption of information stored on the bit-patterned magnetic recording device.

SUMMARY

From the foregoing discussion, it should be apparent that a need exists for an apparatus and a method that prevent adjacent track errors in bit-patterned media. The subject matter of the present application has been developed in response to the present state of the art, and in particular, in response to the problems and needs in the art that have not yet been fully solved by currently available bit-patterned media devices and fabrication methods. Accordingly, the present disclosure has been developed to provide an apparatus and method that overcome many or all of the above-discussed shortcomings in the art by reducing the magnetic islands' susceptibility to magnetic switching while still maintaining a high degree of magnetic readability and writeability.

The present disclosure relates to a magnetic medium that includes a substrate and a bit patterned magnetic layer applied over the substrate. The bit-patterned magnetic layer includes islands and each island includes a first magnetic material having a first magnetic anisotropy and that has a top surface, a bottom surface, and a peripheral (or side) surface. Each island also includes a second magnetic material covering the peripheral surface of the first magnetic material and having a second magnetic anisotropy that is higher than the first magnetic anisotropy.

In one implementation, the second magnetic material may also cover the bottom surface of the first magnetic material. The top surface of the first magnetic material may be covered with a non-magnetic material or may be uncovered. In this implementation the first magnetic material serves as a localized reversal nucleation region. In one embodiment the volume ratio in each island of the first magnetic material to the second magnetic material is in the range of between about 1/100 and 1/2. In another embodiment, the volume ratio in each island of the first magnetic material to the second magnetic material is in the range of between about 1/50 and 1/4.

The present disclosure also includes disclosure related to a method for fabricating a magnetic medium that includes providing a mask layer applied over a magnetic layer applied over a substrate, the magnetic layer including island regions and trench regions. The method further includes patterning the mask layer to expose only a portion of the island regions of the magnetic layer and forming a nucleation domain in the exposed portion of the island regions of the magnetic layer. The nucleation domain has a lower magnetic anisotropy than the magnetic layer. Still further, the method includes reversing the tone of the mask layer and finally etching the magnetic layer in the trench regions to form islands and trenches.

The method may also include forming a nucleation domain by ion bombarding the exposed portion of the island regions of the magnetic layer. In one implementation, the ion bombarding only affects the magnetic anisotropy of the magnetic layer to a certain depth. The ions and components selected for bombarding may include boron, carbon, phosphorus, arsenic, antimony, selenium, sulfur, chromium, silicon, germanium, nitrogen, hydrogen, and metalloid type elements.

In one embodiment the volume ratio in each island of the nucleation domain to the magnetic layer is in the range of between about 1/100 and 1/2. In another embodiment, the volume ratio in each island of the nucleation domain to the magnetic layer is in the range of between about 1/50 and 1/4. In one example, the exposed portion is centrally located on the surface of the island regions.

The present disclosure also includes another method for fabricating a magnetic medium that includes providing a bit-patterned magnetic layer applied over a substrate, the bit-patterned magnetic layer including islands and each island includes a top surface and a peripheral surface. The method continues by applying a mask layer over the top surface of the islands and then forming an outer shell on the peripheral surface of the islands, the outer shell having a magnetic anisotropy that is higher than the magnetic anisotropy of the bit-patterned magnetic layer.

According to one implementation, the forming of the outer shell includes ion implanting a second magnetic material on the peripheral surface of the islands. In another implementation, the ion implantation process is performed at a certain angle with respect to the substrate. For example, the certain angle may be in the range of 5 to 45 degrees. There is a range of usable angles and the angle used would depend upon the details of the groove geometry including the depth and width of the trench and the slope of the walls of the trench. In general, when the ratio of trench depth to trench width is smaller, a higher angle of incidence, relative to normal, can be used. The general trend will be that the groove depth and magnetic media thickness will be as shallow as possible, consistent with thermal stability, to enable higher areal density. The shallower depth in turn will enable higher angles of incidence to be considered.

In one embodiment, the volume ratio in each island of the magnetic layer to the outer shell is in the range of between about 1/100 and 1/2. In another embodiment, the volume ratio in each island of the magnetic layer to the outer shell is in the range of between about 1/50 and 1/4. The method may also include forming an outer shell of magnetic material on the peripheral surface of the islands by selectively removing components from the peripheral surface of the islands.

Reference throughout this specification to features, advantages, or similar language does not imply that all of the features and advantages that may be realized with the present disclosure should be or are in any single embodiment of the present disclosure. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
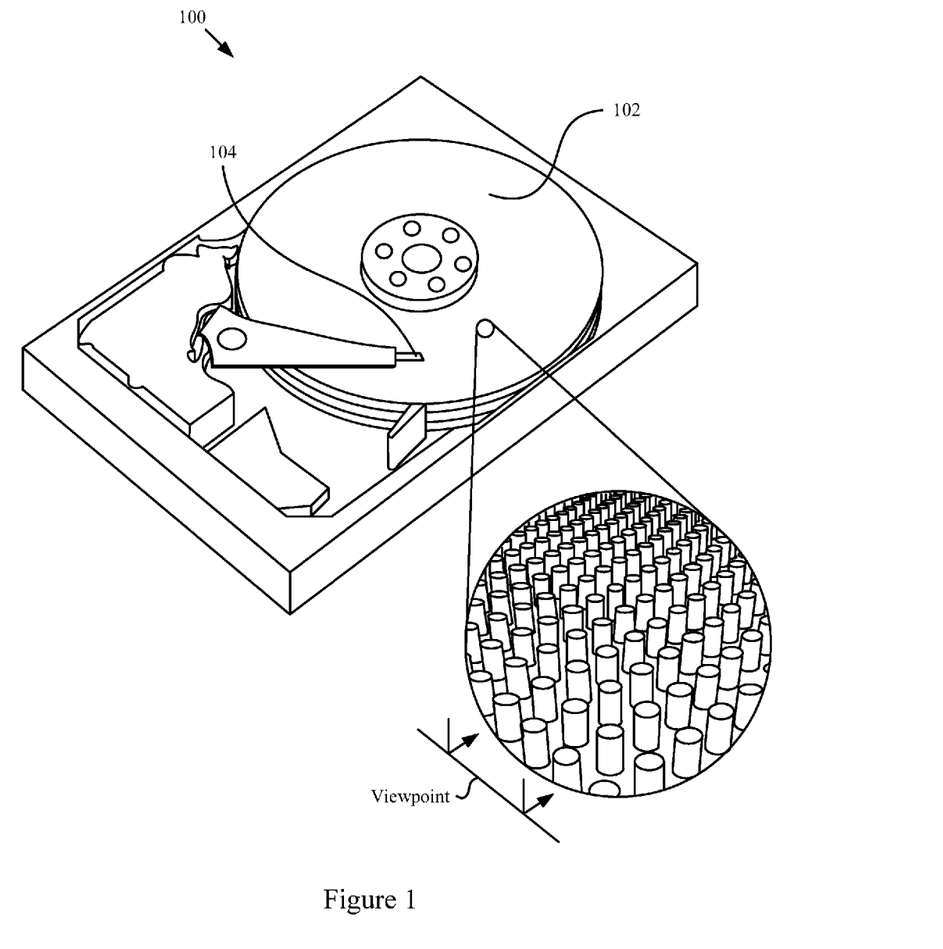
FIG. 1 is a perspective view of one embodiment of a bit-patterned magnetic storage device with a magnified view of the bit-patterned surface.

FIG. 1 is a perspective view of one embodiment of a bit-patterned magnetic storage device 100 with a magnified view of the bit-patterned surface. Bit-patterned magnetic storage devices generally include regions of magnetic material that can be polarized to distinct magnetic states, such as a positive state and a negative state. Each region can store information (generally binary information in the form of either a 1 or a 0) according to the magnetic polarization state of the domain. Accordingly, magnetic storage devices generally include a "read" element 104 that passes over the magnetic material and perceives the magnetic polarization state of each region and a "write" element 104 that passes over the magnetic material and changes the magnetic polarization state of each region, thereby recording individual units of information. The depiction of the read/write head 104 in FIGS. 1, 2A, 2B, and 2C is meant to indicate the presence of the read and write head and is not an exact depiction of what a read and write head looks like.

Bit-patterned magnetic storage devices 100, as briefly described above in the Background section, include islands that are physically etched into a surface. For example, conventional lithography and etching techniques can be used to topographically pattern a surface with intersecting trenches and elevated bit islands. In some instances, the trenches are etched directly into a magnetic material. In other instances the trenches are etched into the substrate and a magnetic material is then coated over the patterned substrate.

Because each bit is a single magnetic island rather than a collection of smaller grains, the physical size of a bit can be decreased while still maintaining a high signal-to-noise ratio and high thermal stability. In one embodiment an inert filler material (not depicted) may be added between the islands (in the trenches) in order to create a substantially smooth surface so that the tops of the islands are coplanar with the surface of the filler material. As the size of magnetic islands decreases, fabrication techniques and read/write head 104 resolutions are pushed to their limits.

Figure 2A:
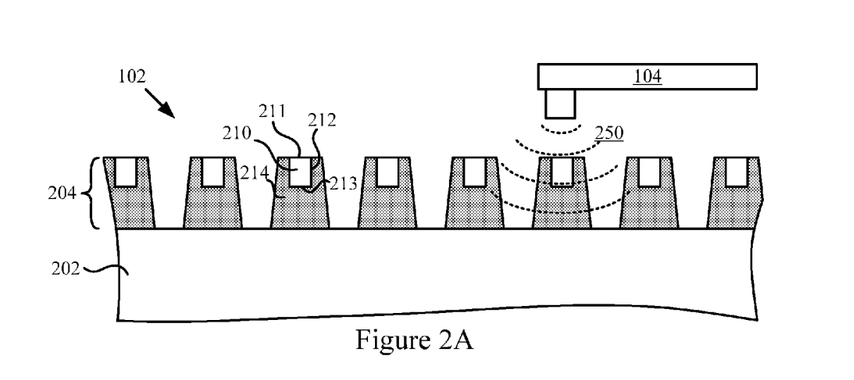
FIG. 2A is cross-sectional side view of one embodiment of a magnetic medium showing a bit-patterned magnetic layer including a first magnetic material and a second magnetic material.
Figure 2B:
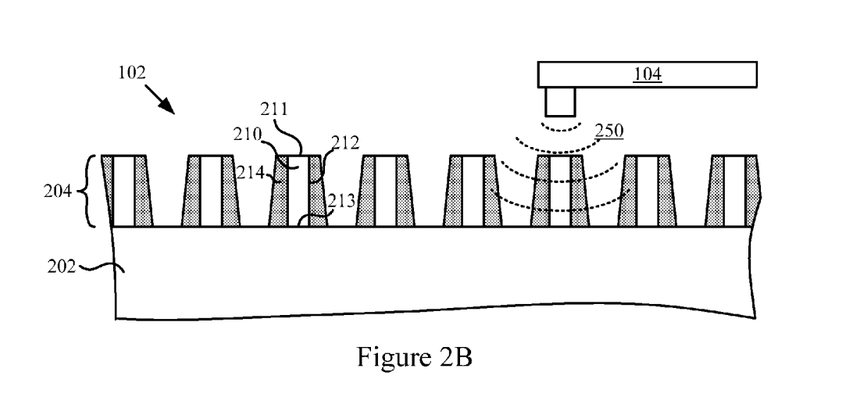
FIG. 2B is a cross-sectional side view of another embodiment of a magnetic medium showing a bit-patterned magnetic layer including a first magnetic material and a second magnetic material.
Figure 2C:
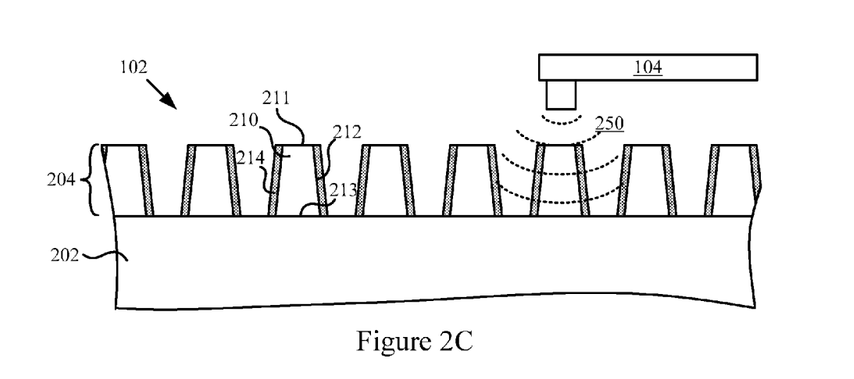
FIG. 2C is a cross-sectional side view of yet another embodiment of a magnetic medium showing a bit-patterned magnetic layer including a first magnetic material and a second magnetic material.

For example, the increased areal density of islands on the surface of a magnetic medium 102 may cause the magnetic field emanating from the read/write head 104 to unintentionally and undesirably interact with adjacent islands, which may cause such adjacent islands to switch polarity or at least lose magnetic moment magnitude. As depicted in FIGS. 2A-2C, the present disclosure relates to preventing this problem of adjacent track exposure by forming a harder magnetic material around a softer magnetic material in each island. The harder magnetic material is not as susceptible to adjacent track exposure but the softer magnetic material located centrally on each island helps maintain the magnetic island's "writeability."

Also included in FIG. 1 is a "viewpoint" depicting a view along the surface of the magnetic medium 102. This "viewpoint" represents one embodiment of the perspective from which the remaining cross-sectional Figures (excluding the schematic flow chart diagrams) are depicted.

FIG. 2A is cross-sectional side view of one embodiment of a magnetic medium 102 showing a bit-patterned magnetic layer 204 including a first magnetic material 210 and a second magnetic material 214. The bit-patterned magnetic layer 204 is applied over a substrate 202. The substrate 202, in one embodiment, is a type of glass or aluminum disk which has various auxiliary magnetic and non-magnetic layers which lie between the glass disk and the bit patterned magnetic layer 204. The auxiliary layers can include adhesion layers, a soft magnetic underlayer, seed layers, grain ordering layers, among others. The islands formed in the bit-patterned magnetic layer 204 can range in width, height, size, and areal density, according to the specifics of a given application. For example, the islands may be substantially frusto-conical, as depicted, or the bits may be substantially rectangular, cylindrical, elliptical, or pyramid-like.

In one embodiment, the magnetic layer 204 is made from a single metallic component, and in other embodiments the magnetic layer 204 is made from metallic alloys and/or multiple metallic components. Magnetic materials (e.g., ferromagnetic alloys) from which the magnetic layer 204 is made can include iron, cobalt, nickel, and alloys thereof. Ferromagnetic alloys also may include oxides, platinum group metals (e.g. ruthenium, rhodium, palladium, and platinum), transition metals, such as Cr, and the like. The composition of the magnetic layers, whether consisting of a single component or a metallic alloy mixture, may be selected according to the specifics of a given application. Throughout the present disclosure, the term "magnetic layer" may refer to a layer made from any ferromagnetic material that has the characteristics of a permanent magnet (i.e. a material that, in pertinent part, exhibits a net magnetic moment in the absence of an external magnetic field).

The required field to reverse a magnetic island depends on the intrinsic magnetic anisotropy of the base magnetic material. The anisotropy of a material depends on chemical composition as well as crystallographic order. Larger anisotropies require larger fields to reverse the magnetic orientation. However, local variations in the magnetic anisotropy or crystallographic orientation can affect the reversal dynamics and lead to lower required fields to reverse the structure. The lower anisotropy regions can nucleate the reversal of the whole island. For example, since the field from a magnetic write head is not uniform, the local anisotropy variations can lead to differences in the minimum head-island separation required to reverse the head. Accordingly, the local anisotropy variations can lead to adjacent track errors. As a result, the optimum island structure is one in which the center of island is lower anisotropy material and the outer shell of the island is higher anisotropy material.

As depicted in the embodiment of FIG. 2A, the second magnetic material 214 coats the peripheral surface 212 and the bottom surface 213 of the first magnetic material 210 while the top surface 211 of the first magnetic material remains uncovered (or at least not covered with a magnetic material). Since the first magnetic material 210 and the second magnetic material 214 are in close proximity to each other, exchange interactions cause the parallel alignment of the magnetic layers 210, 214. In other words, if one of the magnetic materials in an island switches polarity, the other magnetic material in the same island will also switch polarity.

Throughout the disclosure, the gray/dark shaded components represent materials that are comparatively magnetically harder than the components with no shading. In other words, the gray shading indicates a material with a comparatively higher magnetic coercivity and higher magnetic anisotropy than magnetic materials that have no shading (white). Thus, in the embodiment depicted in FIG. 2A, the first magnetic material 210 has a lower magnetic anisotropy and consequently switches polarity at a lower magnetic field, subsequently causing the second magnetic material 214 in the same island to also switch polarity.

When the read/write head 104 passes over a particular track of islands, the magnetic field 250 that emanates from the read/write head causes the desired island (the island beneath the read/write head) to switch polarity. However, the polarity switch of the desired island does not cause the inadvertent polarity switching of adjacent islands with peripheral edges that happen to fall under the magnetic field 250. This is because the peripheral edges of the adjacent islands are made from the harder second magnetic material 214 that is less susceptible to independent polarity switching.

In one embodiment, the first and second magnetic materials 210, 214 refer to magnetic materials with different compositions, such at different alloys of CoCrPt or FePt. The composition differences could also stem from ion implantation with species such as N, P, B, As, Sb, Si, Ge, Cr, Se, S, H or other species. However, in another embodiment, the first and second magnetic materials 210, 214 refer to the same magnetic material but with a different morphology. For example, as mentioned briefly above, the magnitude and alignment of magnetic dipoles can be influenced by the crystallinity of a metal. Therefore, the first and second magnetic materials 210, 214 may actually have the same chemical constitution but may have different morphologies. In other words, throughout the present disclosure, the use of the terms "first magnetic material" and "second magnetic material" are not intended to indicate necessarily two chemically different metals but instead the terms refer to materials with different magnetic coercivities, anisotropies, and/or moments.

In the depicted embodiment, the first magnetic material 210, being surrounded on the peripheral 212 and bottom surfaces 213 by the second magnetic material 214, is considered to be a magnetic nucleation center or a magnetic nucleation domain where it is easier to initiate a polarity switch. Further details relating to this "nucleation domain" embodiment are included below with reference to FIGS. 3 and 4A-4E.

FIG. 2B is a cross-sectional side view of another embodiment of a magnetic medium 102 showing a bit-patterned magnetic layer 204 including a first magnetic material 210 and a second magnetic material 214. In the depicted embodiment, the second magnetic material 214 coats the peripheral surface 212 of the first magnetic material 210, but the top surface 211 is uncovered and the bottom surface 213 is in contact with the substrate 202. In other words, the first magnetic material 210 may be centrally located in the island and the first magnetic material 210 may extend the length/height of the island, thus the nucleation domain may appear similar to an elongated cylindrical core structure.

In one embodiment, the ratio (per island) of the volume of the first magnetic material 210 to the volume of the second magnetic material 214 is in the range of between about 1/100 to 1/2. In another embodiment, the ratio of the volume of the first magnetic material 210 to the volume of the second magnetic material 214 is in the range of between about 1/50 and 1/4. The volume ratio can correspond to differences in the thickness or width of the two materials. The ratios of thickness and width, according to one embodiment, are less constrained and can vary from 1/10 to 1. For example, if the volume ratio of the first magnetic material 210 to the second magnetic material 214 is about 1/64, the corresponding width and thickness ratios of the first magnetic material 210 to the second magnetic material 214 are about 1/4.

FIG. 2C is a cross-sectional side view of yet another embodiment of a magnetic medium 102 showing a bit-patterned magnetic layer 204 including a first magnetic material 210 and a second magnetic material 214. In the depicted embodiment, instead of a nucleation domain that is formed in a centrally located portion of the islands (see FIGS. 3 and 4A-4E), an outer shell of a second magnetic material 214 is formed on the outer periphery of the islands. Further details relating to the outer shell embodiments are included below with reference to FIGS. 5 and 6A-6D.

Figure 3:
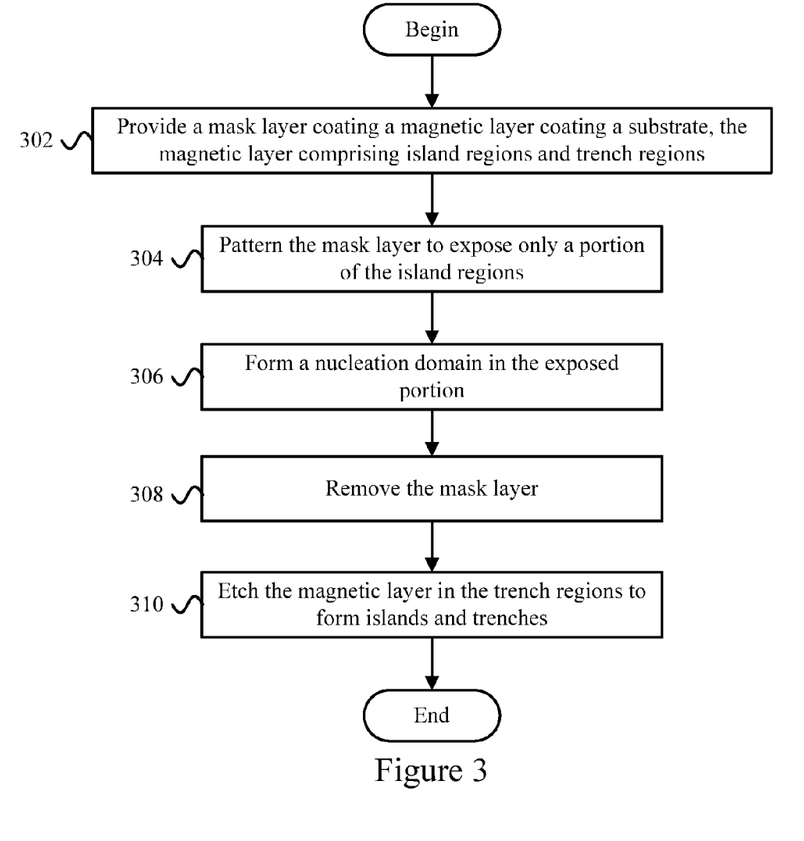
FIG. 3 is a schematic flow chart diagram of one embodiment of a method for fabricating a magnetic medium by forming a nucleation domain in each bit-patterned island.

FIG. 3 is a schematic flow chart diagram of one embodiment of a method for fabricating a magnetic medium by forming a nucleation domain in each bit-patterned island. The method includes providing 302 a mask layer applied over a magnetic layer which is applied over a substrate, wherein the magnetic layer further includes island regions and trench regions. Additional details regarding this step 302 in the method are included below with reference to FIG. 4A.

The method further includes patterning 304 the mask layer to expose only a portion of the island regions and then forming 306 a nucleation domain in the exposed portion. Additional details regarding these steps 304, 306 in the method are included below with reference to FIG. 4B, 4C. The method also includes reversing the tone 308 of the mask layer and then etching 310 the magnetic layer in the trench regions to form islands. Additional details regarding these steps 308, 310 in the method are included below with reference to FIGS. 4D and 4E.

It is important to point out that the description of the method refers to intermittent steps for fabricating the patterned media. In some implementations, after all the processing has been completed to form the magnetic islands with the desired magnetic properties, the grooves in between the magnetic islands are subsequently filled with a non-magnetic material, the top surface of the disk is made relatively smooth by a planarization process and the disk is protected by a protection layer.

Figure 4A:
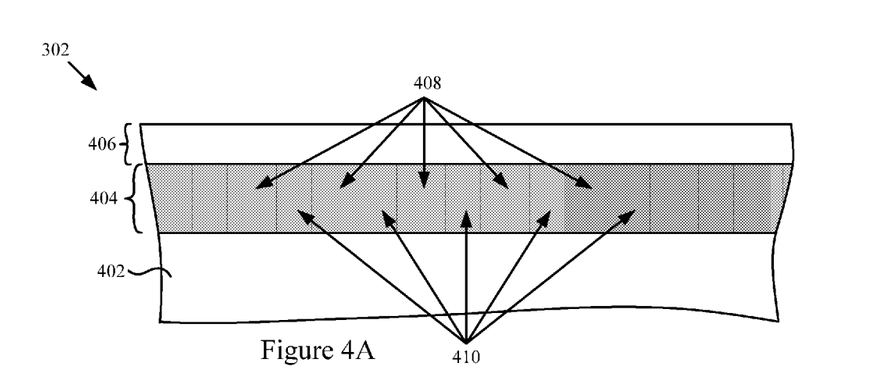
FIG. 4A is a cross-sectional side view of one embodiment of a magnetic medium with a mask layer applied over a magnetic layer which is applied over a substrate.

FIG. 4A is a cross-sectional side view of one embodiment of a magnetic medium 102 with a mask layer 406 applied over a magnetic layer 404 which is applied over a substrate 402. The mask layer may be any masking material that substantially protects the underlying layers 404, 402. In one embodiment, the mask layer 406 includes a single layer of masking material. In another embodiment, the mask layer 406 includes multiple layers of masking materials. For example, silicon nitride, silicon dioxide, diamond-like carbon, and chromium are examples of "hard" masking materials that are substantially durable and will not be damaged or destroyed when the patterned medium is treated with reactive gases or chemical solvents during subsequent processing steps (if desired).

It is also contemplated that the mask layer 406 may include "soft" masking materials, such as polymer films and resist materials, etc. Resist materials may include resist compounds such as those that are used in photo-lithography or electron beam lithography. Such resist materials may be selectively removed to expose various regions and portions of the underlying magnetic material 404. ZEP-520 is an example of a suitable resist material that may be employed as a mask layer 406. Another type of resist materials that may be used as a mask layer 406 is Microposit SJR 5440 photoresist manufactured by Shipley Company of Marlborough, Mass.

FIG. 4A also shows alternating island regions 408 and trench regions 410. These regions identify which portions of the magnetic layer 404 that will remain as elevated islands and which portions of the magnetic layer 404 that will be etched away in subsequent processing steps. Although at this stage in the fabrication of the magnetic medium 102, the magnetic layer 404 is substantially free of physical subdivisions of any kind, the identification of island regions 408 and trench regions 410 in the Figures are used merely for clarity in describing this embodiment for fabricating a magnetic medium 102.

Figure 4B:
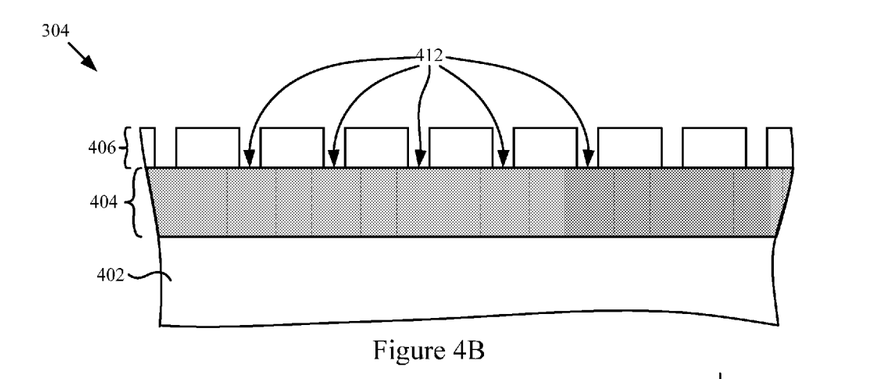
FIG. 4B is a cross-sectional side view of the magnetic medium of FIG. 4A but with the mask layer patterned to expose portions of the magnetic layer, according to one embodiment.

FIG. 4B is a cross-sectional side view of the magnetic medium 102 of FIG. 4A, but with the mask layer 406 patterned to expose portions 412 of the magnetic layer 404, according to one embodiment. As briefly described above with reference to FIG. 4A, the mask layer 406 may be any type of masking or protective layer that can be selectively removed to expose portions of the underlying magnetic layer 404. For example, in using some types of polymer resist materials, such as poly methyl methacrylate ("PMMA"), an electron beam sensitive polymer, portions of the resist material may be exposed with radiation. Subsequently, the exposed portions may be removed through a chemical solvent wash treatment. Patterning the hard mask shown in FIG. 4B can include an additional fabrication step in which a masking material is deposited on top of hard mask 406. The additional masking material can be a soft or hard mask that is patterned on top of the etching hard mask 406.

In the depicted embodiment, the mask layer 406 has been patterned with a series of holes that expose certain regions 412 of the magnetic layer 404 in the island regions 408. In each island region 408, the horizontal cross-sectional area of the exposed portion 412 is at least smaller than the horizontal cross-sectional area of the island region 408. In one embodiment, the exposed portion 412 is centrally located on the surface of the island region 408 of magnetic layer 404. In another embodiment, the exposed portion 412 may not be centrally located on the surface of the island region 408 of the magnetic layer 404 and instead may be aligned with an edge of an island region 408.

Figure 4C:
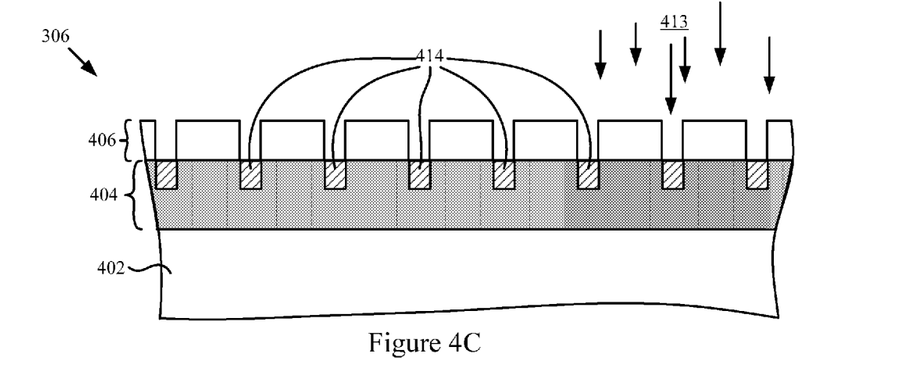
FIG. 4C is a cross-sectional side view of the magnetic medium of FIG. 4B but with a nucleation domain formed in the magnetic layer, according to one embodiment.

FIG. 4C is a cross-sectional side view of the magnetic medium 102 of FIG. 4B but with a nucleation domain 414 formed in the magnetic layer 404, according to one embodiment. The nucleation domain 414, as briefly described above, is a portion of the magnetic layer 404 that has a lower magnetic anisotropy than the rest of the magnetic layer 404. Thus, the nucleation domain 414 facilitates the advertent magnetic polarity switching of an island.

Formation of the nucleation domain 414 may be achieved in a variety of methods. For example, as depicted, atoms, ions, and/or molecules 413 may be accelerated in an electric field and directed towards the magnetic medium 102. This technique, often referred to as ion implantation or ion bombardment, may alter the chemical composition or the morphology of a certain material. The specific components 413 for bombardment may be selected according to the specifics a given application, such as the type of mask layer 406 or the type and thickness of the magnetic layer 404. For example, boron, carbon, phosphorus, arsenic, antimony, selenium, sulfur, chromium, silicon, germanium, nitrogen, hydrogen, and metalloid type elements may be selected as the bombarding components 413 in order to alter the crystallography of the magnetic layer 404 to such an extent that the effected portion (nucleation domain) 414 has a noticeably different (lower) magnetic anisotropy. Thus, the nucleation domain 414 may be a "first magnetic material" for purposes of this disclosure while the rest of the magnetic layer 404 may be a "second magnetic material". Once again, the terms "first" and "second" magnetic material do not necessarily imply materials with distinguishable chemical compositions but rather distinguishable magnetic properties, specifically coercivity and/or anisotropy.

In another embodiment (not depicted), the exposed portion 412 may be etched to a certain depth to form an inner trench within the island region 408. This inner trench then may be filled and/or coated with a magnetic material that has a lower magnetic anisotropy than the original magnetic layer 404. As depicted and according to one embodiment, the nucleation domains 414 may extend only a certain depth into the magnetic layer 404. In another embodiment, the nucleation domains 414 may extend the entire depth of the magnetic layer 404, as depicted in FIG. 2B.

Figure 4D:
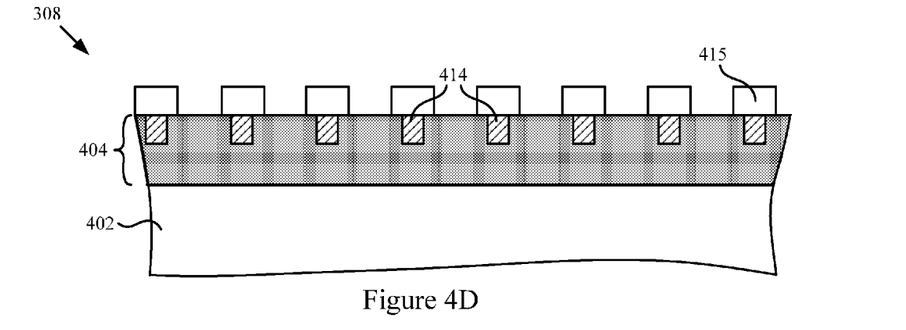
FIG. 4D is a cross-sectional side view of the magnetic medium of FIG. 4C but with the mask layer tone reversed, according to one embodiment.

FIG. 4D is a cross-sectional side view of the magnetic medium 102 of FIG. 4C but with the tone of the mask layer 406 reversed to form a new mask layer 415, according to one embodiment. The tone reversal process can be achieved by depositing new mask material, etching back, and then removing the original mask layer 406. The new mask material 415 can be metals such as Cr, Ta, Al, or Mo or inorganic materials such as SiN or SiO2 or other materials. The materials can be deposited through vacuum deposition techniques such as sputtering or through wet deposition techniques such as spin coating. The deposited material 415 may need to be etched back to expose mask layer 406. The choice of material for the tone reversal should be chosen appropriately so that it will remain when mask layer 406 is removed.

After the tone reversal step, magnetic layer 405 can be etched to create patterned islands with the soft region aligned with the finished island. Prior to etching the media, additional material may be deposited on top of mask 415 to enlarge the mask features if needed. The material can be the same as the mask 415 material or chosen from other suitable materials, such as metals such as Cr, Ta, Al, or Mo or inorganic materials such as SiN or SiO2 or other materials. The materials can be deposited through vacuum deposition techniques such as evaporation, ion beam deposition, or sputtering. The evaporation and ion beam deposition processes can be done at angle between 5 and 45 degrees to ensure primarily side wall deposition.

Figure 4E:
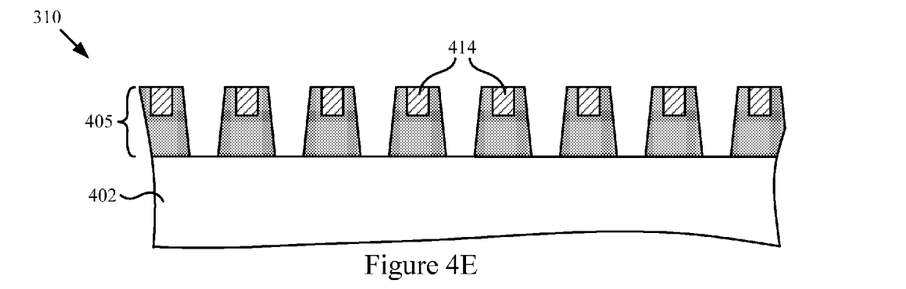
FIG. 4E is a cross-sectional side view of the magnetic medium of FIG. 4D but with a bit-patterned magnetic layer, according to one embodiment.

FIG. 4E is a cross-sectional side view of the magnetic medium 102 of FIG. 4D but with a bit-patterned magnetic layer 405, according to one embodiment. Once the tone of the mask layer 406 has been reversed to form the new patterned mask layer 415, the magnetic layer 404 can be etched to form the trench regions 410. The etching can done using Ar milling, for example. As depicted and according to one embodiment, the magnetic material in the trenches may be completely removed, thus leaving the substrate 402 exposed in the trench regions 410. In another embodiment (not depicted) the magnetic layer 404 in the trench regions 410 may not be entirely removed but only etched to a certain depth, according to the specifics of a given application.

Various types of etching processes (e.g., wet or dry etching) may be used to form the trenches. The details disclosed herein relating to etching processes are only illustrative of the many techniques and approaches involved in nano-fabrication. Therefore, it is contemplated that other etching processes or techniques, which are not described below, fall within the scope of the present disclosure.

Wet etching (i.e. chemical washing) may be used to pattern a layer or a certain material. Wet etching generally involves liquid-phase solutions (i.e. etchants). The material-to-be-etched may be immersed in the etchant and the unmasked regions of the material are dissolved, destroyed, damaged, chemically altered, or otherwise affected so as to be removed. Some etchants are specifically suited for etching certain materials. For example, buffered hydrochloric acid may be used to etch silicon dioxide and potassium hydroxide may be used to etch silicon wafers. Other etchants that may be used include, but are not limited to, hydrochloric acid, citric acid, a mixture of sulfuric acid and hydrogen peroxide (i.e. piranha etch), ammonium fluoride, and hydrofluoric acid.

Dry etching (i.e. reactive ion etching) may also be used to pattern a certain material. Dry etching may be done in a vacuum chamber and generally involves emitting energetic free radicals or ions onto the surface or material-to-be-etched. The emitted particles react with the material and cause the material to disperse or otherwise break down for subsequent removal. Before being emitted, the particles may be energized or accelerated by passing a gas through an electric field, which causes the particles to form a plasma. For example, oxygen or hydrogen or fluorine plasmas may be used to etch certain materials.

Figure 5:
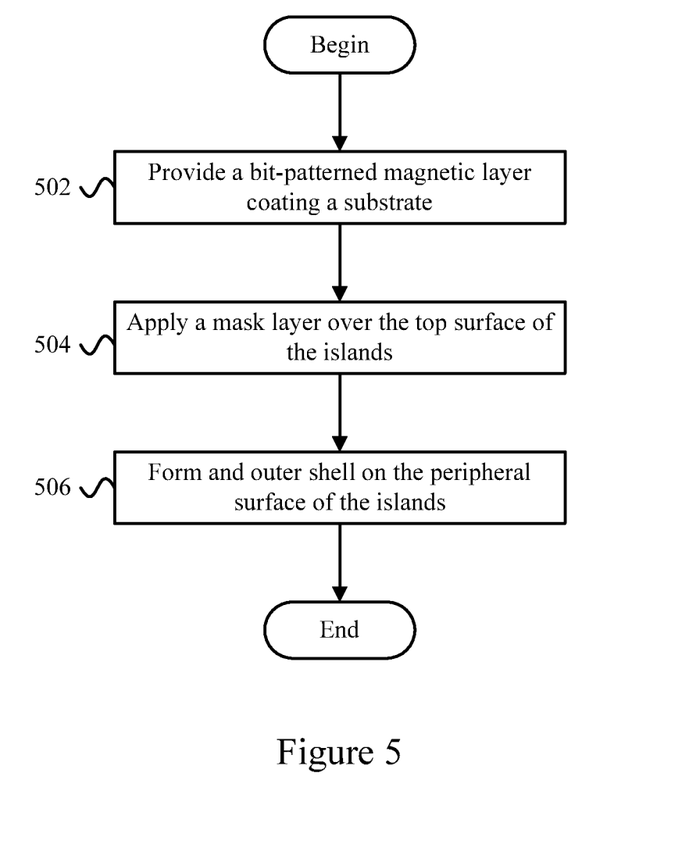
FIG. 5 is a schematic flow chart diagram of one embodiment of a method for fabricating a magnetic medium by forming an outer shell on the peripheral surface of each bit-patterned island.

FIG. 5 is a schematic flow chart diagram of one embodiment of a method for fabricating a magnetic medium by forming an outer shell on the peripheral surface of each bit-patterned island. The method includes providing 502 a bit-patterned magnetic layer which is applied over a substrate, wherein each island of the bit-patterned magnetic layer includes a top surface and a peripheral surface. Additional details regarding this step 502 are included below with reference to FIG. 6A. The method further includes applying 504 a mask layer over the top surface of the islands and then forming 506 an outer shell on the peripheral surface of the islands. Additional details regarding these steps 504, 506 are included below with reference to FIGS. 6B-6D. It is important to point out that the description of the method refers to intermittent steps for fabricating the patterned media. In some implementations, after all the processing has been completed to form the magnetic islands with the desired magnetic properties, the grooves in between the magnetic islands are subsequently filled with a non-magnetic material, the top surface of the disk is made relatively smooth by a planarization process and the disk is protected by a protection layer.

Figure 6A:
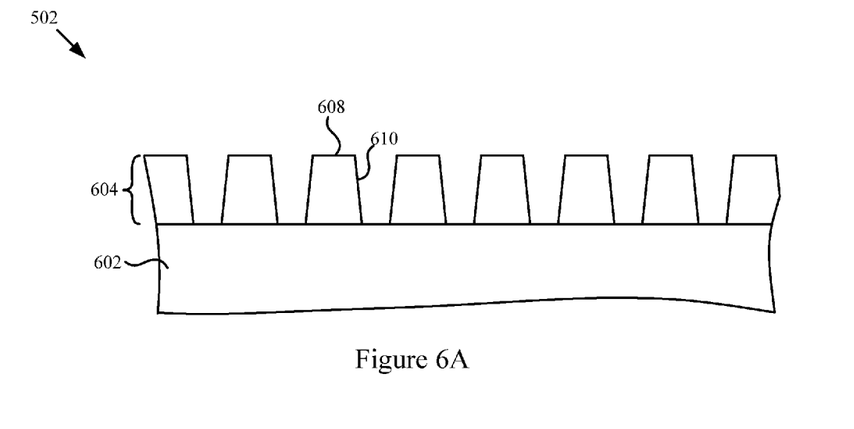
FIG. 6A is a cross-sectional side view of one embodiment of a magnetic medium with a bit-patterned magnetic layer applied over a substrate.
Figure 6B:
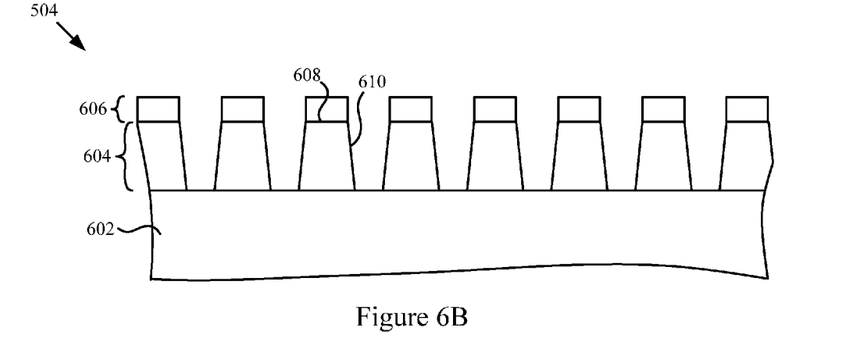
FIG. 6B is a cross-sectional side view of the magnetic medium of FIG. 6A but with a mask layer applied over the top surfaces of the islands, according to one embodiment.

FIG. 6A is a cross-sectional side view of one embodiment of a magnetic medium 102 with a bit-patterned magnetic layer 604 applied over a substrate 602. The bit-patterned magnetic layer 604 includes islands with a top surface 608 and a peripheral surface 610. FIG. 6B is a cross-sectional side view of the magnetic medium 102 of FIG. 6A but with a mask layer 606 applied over the top surfaces 608 of the islands, according to one embodiment. The mask layer 606 may be any protective or resist material as previously described above with reference to FIG. 4A. As depicted, the mask layer 606 is only applied on the top surfaces 608 of the islands.

Figure 6C:
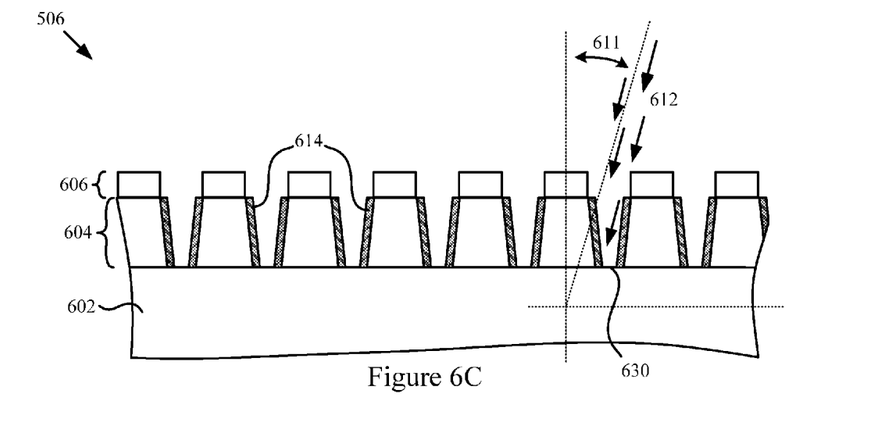
FIG. 6C is a cross-sectional side view of the magnetic medium of FIG. 6B but with an outer shell applied over the peripheral surface of each bit-patterned island, according to one embodiment.

FIG. 6C is a cross-sectional side view of the magnetic medium 102 of FIG. 6B but with an outer shell 614 applied over the peripheral surface 610 of each bit-patterned island, according to one embodiment. In the depicted embodiment, the magnetic material in the island is considered the first magnetic material (white color, no shading) because it has a comparatively lower magnetic anisotropy than the second magnetic material in the outer shell 614 that is applied on the peripheral surface 610 of the islands.

In one embodiment, the outer shell 614 is applied on the peripheral surface 610 of the islands via an ion implantation process. For example, components (ions) 612 may be accelerated in an electronic field and directed towards the surface of the magnetic medium 102 at an angle 611. In one embodiment, the implanting components may be a hard magnetic material such as cobalt or cobalt chromium platinum alloys. The angle 611 may be selected according to the specifics of a given application, depending on a number of factors, including but not limited to island height, island shape (frusto-conical, cylindrical, etc), groove width, and types of materials.

For example, the certain angle may be in the range of 10 to 45 degrees. There is a range of usable angles and the angle used would depend upon the details of the groove geometry including the depth and width of the trench and the slope of the walls of the trench. In general, when the ratio of trench depth to trench width is smaller, a higher angle of incidence, relative to normal, can be used. The general trend will be that the groove depth and magnetic media thickness will be as shallow as possible, consistent with thermal stability, to enable higher areal density. The shallower depth in turn will enable higher angles of incidence to be considered.

The components 612 are implanted at an angle to prevent a magnetic bridge from building up in the bases 630 of the trenches. In one embodiment, however, the components 612 may be implanted from multiple angles or a range of angles and subsequent processing steps, such as etching and removal, may be used to remove the magnetic build-up of implanted magnetic material in the bases 630 of the trenches.

Figure 6D:
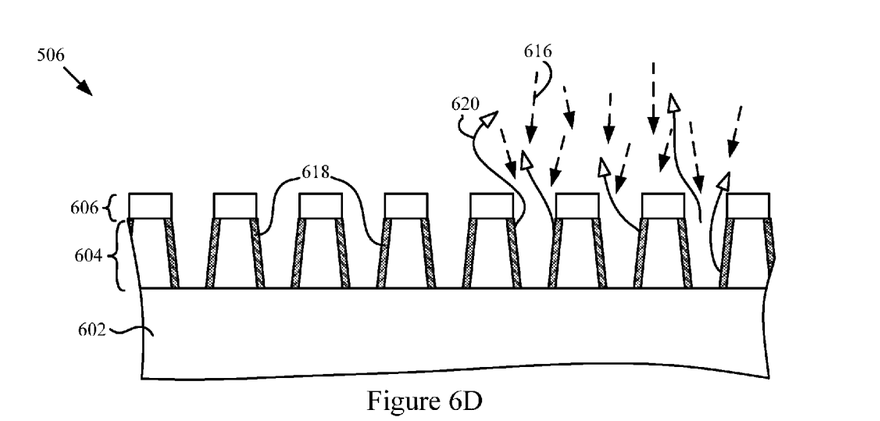
FIG. 6D is a cross-sectional side view of the magnetic medium of FIG. 6B but with an outer shell formed in the peripheral surface of each bit-patterned island, according to one embodiment.

FIG. 6D is a cross-sectional side view of the magnetic medium 102 of FIG. 6B but with an outer shell 618 formed in the peripheral surface 610 of each bit-patterned island, according to one embodiment. Instead of coating the peripheral surface 610 of the islands with a second magnetic material, the outer shell 618 may be formed in the peripheral surface 610 of the islands. For example, as described above with reference to FIG. 6C, angled or sporadic ion bombardment may change the magnetic properties of on the peripheral surface 610 of the islands to the extent that an outer shell 618 of a second magnetic material is formed.

In another embodiment, a chemically selective technique may remove certain components from the peripheral edges 610 of the islands, thus increasing the magnetic coercivity of the outer shell 618. For example, if the magnetic material in the magnetic layer 604 contains chromium, an oxygen and chlorine plasma or an argon plasma 616 may remove chromium atoms 620 from the peripheral surface 610 of the islands, thus increasing the magnetic anisotropy of the outer shell 618. Other components 616 or processes may be used to remove certain elements or compounds 620 from the peripheral surface 610 of the magnetic layer 604 based on the specifics of a given application.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation"

means an implementation having a particular feature, structure, or characteristic described in connection with one or more embodiments of the subject matter of the present disclosure, however, absent an express correlation to indicate otherwise, an implementation may be associated with one or more embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for fabricating a magnetic recording medium, comprising:

providing a medium comprising a mask layer applied to a magnetic layer, wherein the magnetic layer is applied to a substrate, the magnetic layer comprising island regions and trench regions;

patterning the mask layer to expose only an exposed portion of each island region of the magnetic layer, wherein the horizontal cross-sectional area of the exposed portion of each island region is smaller than the horizontal cross-sectional area of each island region, wherein an unexposed portion of each island region remains covered by the mask layer;

forming a nucleation domain in the exposed portion of each island region of the magnetic layer, wherein the nucleation domain has a lower magnetic anisotropy than the magnetic layer;

reversing the tone of the mask layer so that the mask layer covers the island regions and exposes the trench regions; and etching the magnetic layer in the trench regions to form trenches and define islands.

2. The method of claim 1, wherein forming a nucleation domain comprises ion bombarding the exposed portion of the island regions of the magnetic layer.

3. The method of claim 2, wherein patterning the mask layer comprises completely removing the mask layer in the exposed portion of each island region.

4. The method of claim 2, wherein the bombarding ions are selected from the group consisting of: carbon, phosphorus, arsenic, antimony, selenium, sulfur, chromium, silicon, germanium, nitrogen, hydrogen, boron, and metalloid type elements.

5. The method of claim 1, wherein the volume ratio in each island of the nucleation domain to the magnetic layer is in the range of between about 1/100 and 1/2.

6. The method of claim 1, wherein the volume ratio in each island of the nucleation domain to the magnetic layer is in the range of between about 1/50 and 1/4.

7. The method of claim 1, wherein the nucleation domain is centrally located on the surface of the island regions.

* * * * *

UNITED STATES PATENT AND TRADEMARK OFFICE
CERTIFICATE OF CORRECTION

PATENT NO.        : 9,190,093 B2
APPLICATION NO.   : 13/760886
DATED             : November 17, 2015
INVENTOR(S)       : Michael Grobis et al.

It is certified that error appears in the above-identified patent and that said Letters Patent is hereby corrected as shown below:

IN THE DRAWINGS

Figure 5, Step 506
    "Form and outer shell"---should read "Form an outer shell"

IN THE SPECIFICATION

Column 9, Line 67
    "specifics a given"---should read "specifics of a given"

Column 10, Line 52
    "done at angle"---should read "done at an angle"

Signed and Sealed this
Fifteenth Day of March, 2016

Michelle K. Lee
*Director of the United States Patent and Trademark Office*